June 29, 1954
G. CAMILLI
2,682,173
FLUID COOLED ELECTRICAL APPARATUS COMBINED
WITH RESPONSE-COMPENSATED TEMPERATURE
MEASURING DEVICE
Filed June 23, 1950
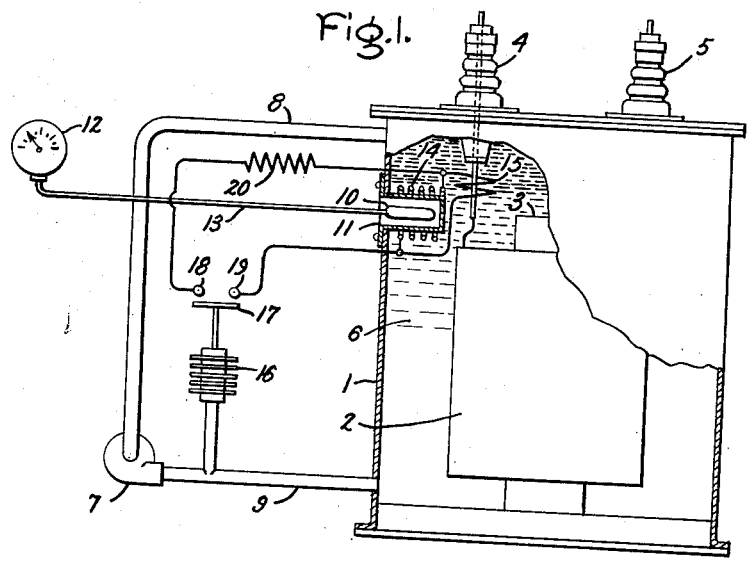
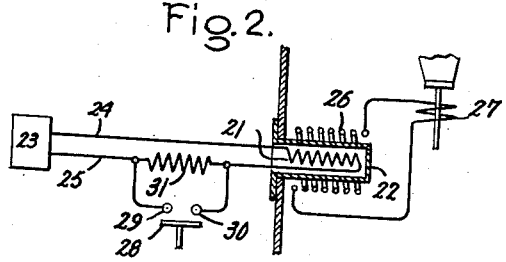
Inventor:
Guglielmo Camilli,
by Ernest C. Britton
His Attorney.

Patented June 29, 1954

2,682,173

UNITED STATES PATENT OFFICE 2,682,173

FLUID COOLED ELECTRICAL APPARATUS COMBINED WITH RESPONSE-COMPENSATED TEMPERATURE MEASURING DEVICE

Guglielmo Camilli, Pittsfield, Mass., assignor to General Electric Company, a corporation of New York Application June 23, 1950, Serial No. 169,984

4 Claims. (Cl. 73—350)

This invention relates to thermal-responsive devices for use with liquid-cooled electrical apparatus and more particularly to an emergency calibrating device responsive to conditions of the liquid circulatory system for the electrical apparatus.

Certain types of electrical apparatus, such as transformers, for example, are frequently immersed in a liquid such as oil, the liquid serving both as an insulating medium and a cooling medium. On large installations, the liquid used is often force-circulated through the containing tank for the apparatus and through exterior cooling devices, such as radiator tubes, by a pump which forces the liquid through the system.

In order to ascertain the temperature of the electrical windings on such apparatus, it is common practice to immerse a thermal-responsive element in the liquid inside of the tank and to surround this thermal-responsive element with a heating coil which is energized from a current transformer in one of the power lines connected to the apparatus. Thus, the immersed thermal-responsive element is affected by both the temperature of the liquid surrounding the electrical apparatus and also by the amount of current passing through the windings of the electrical apparatus, as indicated by the current transformer. The degree of heat in the heating coil surrounding the thermal-responsive element is proportioned to the amount of current flowing through the winding of the current transformer. In measuring systems of this kind, the amount of heat given off by this heating coil is an indication of the temperature differential between the electrical apparatus and the surrounding liquid. By subjecting the thermal-responsive element to both the liquid temperature and also to a heating-coil temperature proportioned to the current flow in the windings of the apparatus, it is possible to simulate the thermal conditions existing in the electrical windings of the apparatus.

One difficulty which has been encountered in the measurement of hot spot temperatures when using an arrangement such as that hereinbefore described with forced circulation cooling systems is that the indication of temperature given by the thermal-responsive element is calibrated in terms of a circulating cooling system, and if, for any reason, there is a failure of the cooling system due to pump failure, for example, the temperature indication given will be false. This is due to the fact that the temperature rise of the liquid-immersed electrical windings over the temperature of the surrounding liquid for a given load current is much greater for a static liquid condition than for a flowing liquid condition, since the heat transfer from the electrical winding at any given temperature is a function of the circulation of the liquid, and substantially more heat will be removed from the winding when the liquid is circulating than when it is not circulating. Hence, a thermal-responsive device which is calibrated upon the basis of a circulating liquid flow will no longer give a true reading when the liquid is no longer circulating due to some condition such as a pump failure.

It is an object of my invention, therefore, to provide an automatic calibrating means for use with a liquid-immersed thermal-responsive element which will automatically compensate the indications of the thermal-responsive element for failure in the circulatory system of a liquid-cooled electrical apparatus, such as a transformer.

It is a further object of my invention to provide a means to automatically compensate for failure in the circulatory system of liquid-cooled electrical apparatus insofar as such failure results in erroneous temperature indications.

In accordance with these objectives, my invention provides a pressure-sensitive device responsive to the pressure failure of the circulatory system of an electrical apparatus which operates in such manner as to modify the characteristics of the heating coil circuit for the thermal-responsive element in response to such pressure failure. In a modified form of my invention for use with thermal-responsive resistance elements, I employ a pressure-sensitive device to insert a calibrating resistance in the circuit with the thermal-responsive resistance element when the pressure of the circulatory system fails.

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 represents a conventional transformer having a liquid-immersed thermal-responsive element, with a pressure-responsive device controlling a shunting resistance in the circuit of a heating coil adjacent the thermal-responsive element; while Fig. 2 represents a modified form of my invention in which the pressure-responsive element controls a resistance in the circuit of a thermal-responsive resistance element.

Referring now to the drawing, there is shown a transformer casing 1 in which is contained a transformer winding 2 positioned on a magnetic transformer core 3. Insulating bushings 4 and 5 pass through the top surface of tank 1 and serve to insulate the conductors which lead from the winding 2 to the external circuits to which winding 2 is connected. The interior of transformer tank 1 is filled with a suitable cooling and insulating liquid 6, such as oil, for example, to a level above the top of the transformer core. A pump 7 is provided, preferably on the exterior of the transformer tank, to provide forced circulation of the oil through the transformer tank and also through any cooling devices which may be provided. These cooling devices are not illustrated in the drawing but may take any suitable form, such as, for example, radiator tubes mounted on the outside surface of the tank. The pump 7 communicates with the upper and lower surfaces of the interior of the tank 1 by means of conduits 8 and 9 respectively.

In order to provide a suitable indication of the temperature of winding 2, a thermal-responsive element 10, which, in this case, is a bulb containing a volatizable fluid, is contained in a well member 11 positioned interiorly of tank 1. The thermal-responsive element 10 is connected to any suitable indicating or relay device 12 which is located at some point exterior of the transformer tank. Since the particular thermal-responsive element shown is a bulb containing volatilizable fluid, a capillary tube 13 is used to connect the thermal-responsive element 10 to the indicating or relay device 12. The well 11 in which thermal-responsive element 10 is enclosed is surrounded on at least part of its exterior surface by a heating coil 14 which is energized by a current transformer 15 in series with one of the conductors leading to winding 2.

The heating coil 14 may be adjusted in such manner that the temperature indicated by indicating device 12 corresponds to the calculated temperature of the copper conductors on winding 2 at any given load on the transformer. Thus, the thermal-responsive element 10 will simulate the thermal conditions present in the transformer winding 2. However, for a forced flow cooling system, this initial adjustment or calibration is made on the basis of a continuously circulating liquid flow, and failure of such liquid flow will produce erroneous readings at the indicating device 12.

In order to compensate for any error which would be introduced into the readings of indicating device 12 by failure of the liquid circulatory system, I have provided a compensating means in accordance with my invention which will now be described.

In accordance with my invention, a pressure-sensitive element, such as a bellows 16, is hydraulically connected to the liquid flow system, preferably near the outlet of pump 7. The pressure-sensitive device 16 is provided with a contact arm 17 which moves with the bellows. Contact arm 17 is adapted to bridge contacts 18 and 19 when the hydraulic pressure of the liquid circulatory system causes bellows 16 to move to its fully expanded position. When contact arm 17 bridges contacts 18 and 19, a resistance element 20 is inserted in parallel with heating coil 14, and diverts part of the current output of current transformer 15 away from heating coil 14. When this situation prevails, the current through heating coil 14 for a given current through the transformer 15 is less than when the circuit of resistance element 20 is open, and, consequently, the heat given off by heating coil 14 is less. However, if the liquid pressure of the circulatory system decreases for some reason, such as a pump failure, bellows 16 will move to a contracted position and contact arm 17 will no longer bridge contacts 18 and 19. When this happens, the circuit of the resistance element 20 is opened, and all of the current through the secondary of current transformer 15 passes through heating coil 14. For a given load current passing through the primary of the current transformer, the heating coil 14 then gives off more heat. Opening the circuit of shunting resistance 20 when the circulatory system fails will result in a changed reading of indicating device 12. For a given transformer or other apparatus, the increase in winding temperature when the pump is not operating can be calculated, and the value of resistance element 20 can be made of such value as to cause indicating device 12 to give a proper reading of the increased temperature when the pump is not operating. The necessary value of the resistance to be added will also depend on the effect, if significant, of circulation failure on the heat transfer relation between heating coil 14 and element 10.

In Fig. 2 I have illustrated a modified form of my invention for use with a resistance-type thermal-responsive element. There is shown in Fig. 2 a thermal-responsive resistance element 21 contained in a well member 22 positioned interiorly of the tank for an electrical apparatus. The thermal-responsive resistance element is connected to any suitable indicating or relay device 23 by means of leads 24 and 25 which are respectively connected at opposite ends of thermal-responsive resistance element 21. The well 22 in which thermal-responsive element 21 is enclosed is surrounded on at least part of its exterior surface by a heating coil 26 which is energized by a current transformer 27 in series with one of the conductors leading to the electrical apparatus.

In accordance with my invention, the pressure-sensitive element, such as a bellows (not shown in this figure), operates a contact arm 28. Contact arm 28 is adapted to bridge contacts 29 and 30 when the hydraulic pressure of the liquid circulatory system causes the pressure-sensitive element to move to its fully expanded position. When contact arm 28 bridges contacts 29 and 30, a resistance element 31 in series with thermal-responsive resistance element 21 is shorted out and has no effect on the action of control or indicating device 23. However, if the liquid pressure of the circulatory system decreases for some reason, such as a pump failure, the pressure-responsive device will move to a contracted position and contact arm 28 will no longer bridge contacts 29 and 30. As a result, resistance element 31 is no longer shorted and is inserted in the circuit with thermal-responsive resistance element 21. Introduction of resistance element 31 into the circuit of indicating device 23 will result in a changed reading of indicating device 23. For a given transformer or other apparatus, the increase in winding temperature when the pump is not operating can be calculated, and the value of resistance element 31 can be made of such value as to cause indicating device 23 to give a proper reading of the increased temperature when the pump is not operating. The necessary value of the resistance to be added will also depend on the effect, if significant, of circulation failure on the heat-transfer relation between heating coil 26 and element 21.

From the foregoing, it can be seen that I have provided a new and improved device for compensating for false temperature indications when the liquid circulation system of an electrical apparatus such as a transformer is not in operation, due to some reason such as a pump failure.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a cooling arrangement for electric apparatus immersed in a fluid, circulating means normally operating to force a flow of fluid about said apparatus, a system for measuring the temperature of said apparatus comprising an indicating temperature measuring device, an electric heating element energizable in accordance with the electrical current flow through said electric apparatus, said temperature measuring device being in temperature measuring relation with said heating element and also with the fluid in which said electric apparatus is immersed whereby the indication of said temperature measuring device is indicative of the temperature of the electric apparatus when said fluid circulating means is in operation, an auxiliary electric circuit including a resistance adapted to reduce the energization of said electric heating element when the said circuit is connected with said electric heating element, said auxiliary circuit being completed to reduce the energization of said heating element when said fluid circulating means is in operation, and means adapted to open said auxiliary circuit in response to the non-operation of said fluid circulating means whereby the energization of said heating element is increased consonant with the increased temperature of the fluid in which said electric apparatus is immersed to enable said temperature measuring device to continue to reflect the temperature of said electric apparatus when said fluid circulating means is non-operative.

2. The cooling arrangement of claim 1 wherein the electric heating element is in the form of a coil immersed in the cooling fluid and surrounding a portion of the temperature measuring device.

3. The cooling arrangement of claim 1 wherein the auxiliary circuit is connected by a switch operated from a fluid-pressure-sensitive device connected to the circulating means.

4. In combination, an electrical apparatus immersed in an insulating liquid, means for circulating said liquid in heat exchange relation to said apparatus, a thermal-responsive element responsive to variations in the temperature, indicator means actuated by said thermal-responsive element, a heating coil in heat exchange relation to said liquid and to said thermal-responsive element, said heating coil being energized by heating current in accordance with the electrical current flowing in said electrical apparatus so as to reflect the temperature differential between said apparatus and said liquid, a shunting resistance in parallel with said heating coil and adapted to shunt some of said heating current from said coil when said liquid is being circulated, and pressure-sensitive means operatively connected to said circulating means and responsive to failure of said circulating means for varying the response of said thermal-responsive element in accordance with the changed thermal condition of said electrical apparatus induced by said circulation failure, said pressure-sensitive means normally maintaining said shunting resistance in parallel with said heating coil, failure of said circulating means causing said pressure-sensitive means to move in such a direction as to open the circuit of said shunting resistance.

References Cited in the file of this patent

UNITED STATES PATENTS

| Number | Name | Date |
|---|---|---|
| 1,477,456 | Simmon | Dec. 11, 1923 |
| 1,835,470 | Clarke | Dec. 8, 1931 |
| 1,879,276 | Isaac | Sept. 27, 1932 |
| 2,026,375 | Camilli | Dec. 31, 1935 |
| 2,349,673 | Pearson et al. | May 23, 1944 |

FOREIGN PATENTS

| Number | Country | Date |
|---|---|---|
| 536,025 | Great Britain | Apr. 30, 1941 |